United States Patent
McClure et al.

(10) Patent No.: US 8,220,754 B2
(45) Date of Patent: Jul. 17, 2012

(54) PLASMA ENHANCED RIBLET

(75) Inventors: Paul D. McClure, Fort Worth, TX (US);
Sergey Macheret, Palmdale, CA (US);
Brian R. Smith, Colleyville, TX (US);
Kurt M. Chankaya, Keller, TX (US)

(73) Assignee: Lockheed Martin Corporation,
Bethesda, MD (US)

( * ) Notice: Subject to any disclaimer, the term of this patent is extended or adjusted under 35 U.S.C. 154(b) by 520 days.

(21) Appl. No.: 12/477,760

(22) Filed: Jun. 3, 2009

(65) Prior Publication Data
US 2010/0308177 A1    Dec. 9, 2010

(51) Int. Cl.
*B64C 21/00* (2006.01)
(52) U.S. Cl. ........................................ 244/205
(58) Field of Classification Search ................. 244/200, 244/200.1, 204, 204.1, 205
See application file for complete search history.

(56) References Cited

U.S. PATENT DOCUMENTS

| | | | |
|---|---|---|---|
| 4,907,765 A * | 3/1990 | Hirschel et al. ............... 244/200 |
| 4,932,612 A | 6/1990 | Blackwelder et al. |
| 5,133,516 A * | 7/1992 | Marentic et al. ............... 244/130 |
| 5,359,951 A | 11/1994 | Meng |
| 5,901,928 A | 5/1999 | Raskob, Jr. |
| 5,934,622 A * | 8/1999 | Meng ............................. 244/205 |
| 5,941,481 A | 8/1999 | Snarski |
| 5,971,326 A * | 10/1999 | Bechert ......................... 244/200 |
| 5,988,568 A * | 11/1999 | Drews ........................... 244/200 |
| 6,345,791 B1 | 2/2002 | McClure |
| 6,520,455 B2 | 2/2003 | Karniadakis et al. |
| 6,570,333 B1 | 5/2003 | Miller et al. |
| 6,805,325 B1 * | 10/2004 | Malmuth et al. ............... 244/205 |
| 7,017,863 B2 * | 3/2006 | Scott et al. .................... 244/205 |
| 7,066,431 B2 | 6/2006 | Scott et al. |
| 7,380,756 B1 * | 6/2008 | Enloe et al. .................... 244/175 |
| 2004/0195463 A1 * | 10/2004 | Scott et al. .................... 244/205 |
| 2008/0023589 A1 * | 1/2008 | Miles et al. .................... 244/205 |
| 2008/0061192 A1 | 3/2008 | Sullivan |
| 2008/0067283 A1 | 3/2008 | Thomas |
| 2008/0122252 A1 * | 5/2008 | Corke et al. ................... 296/180.2 |

\* cited by examiner

*Primary Examiner* — Tien Dinh
*Assistant Examiner* — Keith L Dixon
(74) *Attorney, Agent, or Firm* — Bracewell & Giuliani LLP

(57) ABSTRACT

An object moving through a fluid uses plasma to keep turbulent mixing vortices associated with turbulent air away from the majority of the surface of the object. The plasma may be used to enhance physical riblets, or the plasma may create a virtual riblet.

20 Claims, 2 Drawing Sheets

PLASMA ENHANCED RIBLET

BACKGROUND

1. Technical Field

This disclosure relates in general to using plasma to reduce the viscous drag exerted by turbulent mixing vortices on an object moving through a fluid. This disclosure relates in particular to generating plasma between and above physical riblets and to generating plasma flow to create virtual riblets on the surface of an object moving through fluid to reduce the drag on the object.

2. Description of Related Art

A friction-reducing texture known as "riblets" may be used on the surface of an object passing through a fluid to reduce the friction drag on the object. Riblets are V-shaped grooves having a peak or ridge, and a valley. The sides of the valley are at an angle relative to the surface of the object. Riblets always extend along the aerodynamic surface in the direction of fluid flow. The V-shaped grooves are on the order of 10's to 100's of microns across and are used to modify the turbulent boundary layer structure. The riblet peaks are spaced closer than the dimensions of the turbulent mixing vortices and therefore force the vortices away from most of the exposed (or "wetted") surface area. Thus the wetted area between the peaks is protected from the vortices and experience low local friction. The vortices do exist close to the riblet peaks and the viscous drag is high in the area near the peaks. The shape of the riblet may increase the surface area of the object by 40%. The combination of increased surface area and the remaining viscous drag at the peak of the riblet results in a reduction of viscous drag of just 6%.

The height of the riblets and the spacing between the riblets are usually uniform and on the order of 0.001 to 0.02 inches for most applications. Dimensionless units, sometimes referred to as wall units, are conventionally utilized in describing fluid flows of this type. The wall unit h+ is the non-dimensional distance away from the wetted surface or more precisely in the direction normal to the surface, extending into the fluid. Thus h+ is a non-dimensional measurement of the height of the riblets. The wall unit s+ is the non-dimensional distance tangent to the local surface and perpendicular to the flow direction, thus the non-dimensional distance between the riblets. In the prior art riblets, h+ and s+ are in the range between 10 and 20.

Under special circumstances, flow near the leading edge of a smooth surface moving through a fluid may be laminar. Laminar flow is fluid flow above the surface that is layered and steady. The boundary layer is a layer of fluid wherein the velocity of the fluid, relative to the surface, transitions from zero at the surface to the full velocity of the fluid in the free stream above the surface. As the fluid moves along the surface in a downstream direction, viscosity acts on the fluid causing the boundary layer to thicken as it is slowed by internal friction. When instabilities in the boundary layer create turbulent mixing vortices, the laminar boundary layer becomes a turbulent boundary layer. The turbulent flow in the boundary layer increases mixing and results in higher viscous forces between the fluid and the surface. Flow separation occurs at a point where the boundary layer separates from the surface. Turbulent boundary layers cause the vast majority of skin friction on vehicles in applications such as aircraft, trains, and automobiles, but successful means of reducing the skin friction associated with turbulent boundary layers has been historically elusive.

DETAILED DESCRIPTION

Figure 1:
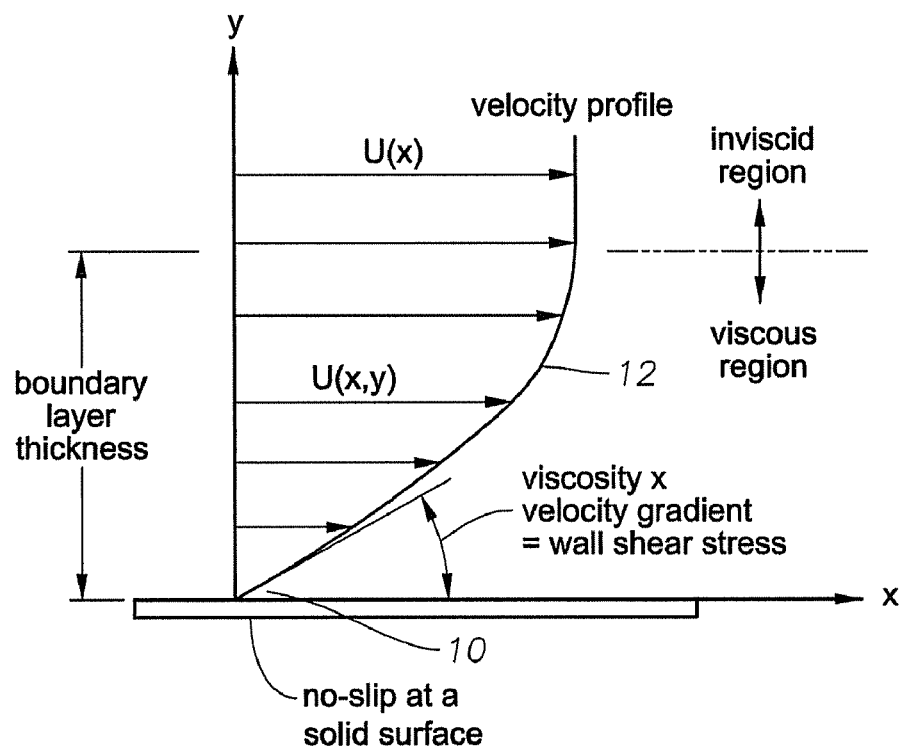
FIG. 1 is a chart showing the fluid velocity profile of an object moving through a fluid.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Referring to FIG. 1, the x-axis shows velocity. The y-axis shows distance from the surface. Wall shear stress, or local friction drag, is created as an object moves through a fluid. The fluid in contact with the surface 10 is stationary, relative to the surface. As the distance from the surface increases, the fluid moves more quickly in relation to the surface. The wall shear stress, and thus friction drag, increase as the fluid velocity increases rapidly near the object surface. Velocity profile 12 illustrates the increase in velocity relative to the distance from the surface. The boundary layer comprises the viscous region, wherein the velocity of the fluid is less than the free-stream velocity of fluid located away from the surface. The inviscid region is the region outside of the boundary layer where the wall shear stress no longer affects the velocity of the fluid.

Figure 2:
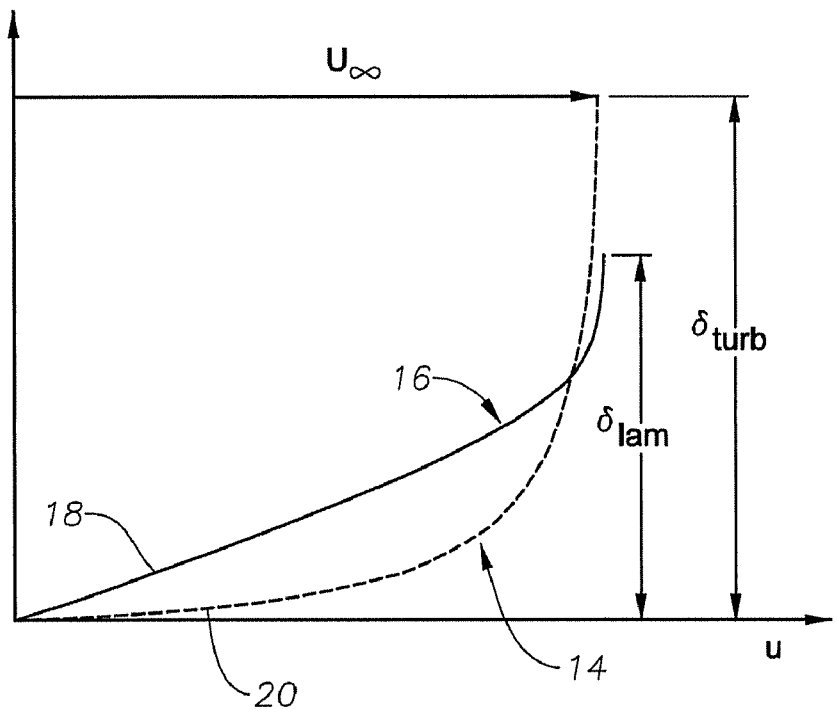
FIG. 2 is a chart showing the velocity profiles of a turbulent and laminar boundary layers of an object moving through a fluid.

Referring to FIG. 2, for a surface moving at a given velocity, comparing the turbulent boundary layer profile 14 to the laminar boundary layer profile 16 illustrates that a turbulent boundary layer has greater drag on the object than a laminar boundary layer. In laminar flow, the velocity increases more gradually as the distance from the surface is increased, whereas in turbulent flow, the velocity increases more rapidly as the distance from the surface is increased. Thus, for laminar flow, the velocity gradient is smaller and the drag on the surface is lower. In turbulent flow, however, there is a greater velocity gradient 20 between the fluid and the surface, thus causing a higher drag.

Flow separation may occur when the flow stream separates from the surface. The separation point is the point on the surface, measured from the leading edge of the surface, at which the boundary flow begins to separate from the surface. Some surface modification devices are known to delay separation, wherein the device causes the separation to occur at a point further back from the leading edge, in the streamwise direction. In some embodiments, plasma enhanced riblets and plasma virtual riblets (each described below) do not significantly delay nor prevent separation. Rather, plasma enhanced riblets and virtual riblets reduce the viscous drag associated with turbulent boundary layers.

Figure 3:
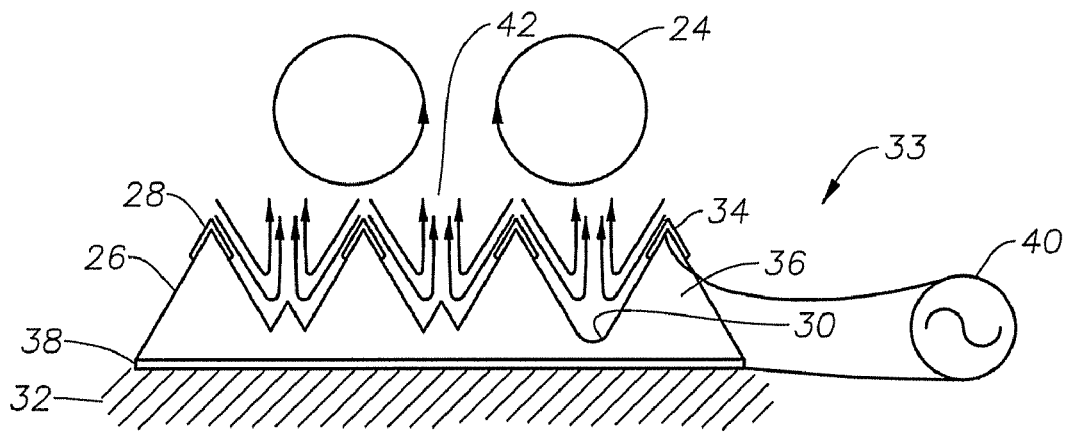
FIG. 3 is a cross-sectional view of an exemplary embodiment of plasma enhanced riblets, wherein the exposed electrode is at the peak of the riblet.

Referring to FIG. 3, much of the increased drag in a boundary layer fluid is due to turbulent mixing vortices 24. Turbulent mixing vortices 24 are small pockets of rotating fluid just above the surface. Vortices 24 may occur in counter-rotating pairs. The axis of the rotating vortex is generally parallel to the direction of flow. As the vortex 24 spins, fluid moving at a high velocity, relative to the surface, is transported from an area above the surface to the surface. The vortical pockets of high velocity fluid, at the surface, are responsible for much of the friction drag acting against the movement of the surface in a turbulent boundary layer.

Referring to FIG. 3, a riblet 26 is a microscopic ridge in the surface. Multiple riblets 26 typically form an integrated series of groove-like peaks 28 and valleys 30 with V-shaped cross sections. Riblets 26 usually extend along an aerodynamic surface 32 in the direction of fluid flow. When looking at FIGS. 3-5, the fluid flow is straight into the page.

The height and peak-to-peak riblet 26 spacing is chosen so that turbulent mixing vortices 24 formed in the fluid cannot fit between the riblets 26. The riblet gap is smaller than the vortice, so the vortice rotates above the ridge and does not contact the surface of the valley. Thus high viscous drag exists only at the peaks 28, and only a very low local drag exits between the peaks (on the surface of the valleys). Conventional riblets 26 can achieve a 6% drag reduction in spite of a 40% increase in wetted area.

A plasma generator 33 comprises an electrode 34 on the surface, a dielectric barrier 36 and an electrode 38 below the dielectric barrier. In an alternative embodiment, the riblets 26 could be made out of a dielectric material. An AC or pulsed power supply 40 is used to apply a voltage to the electrodes. This device is known as a solid state dielectric barrier discharge ("DBD") device. In an exemplary embodiment, the DBD device creates a jet of plasma 42 between the exposed electrode 34 and buried electrode 38.

In an exemplary embodiment, the exposed electrodes 34 are located at the ridges 28 of riblets 26. The buried electrode 38 is located below the groove 30 between the ridges 28. The plasma jet 42 flows from the exposed electrode 34 at the ridge 28 towards the buried electrode 38 below the groove 30. An electrode on the neighboring ridge 28 also generates plasma 42 in the same manner, from the ridge 28 towards the groove 30. When the two plasma jets 42 collide, the plasma is forced up, away from the surface 32. The plasma jets 42 push the turbulent mixing vortices 24 away from the surface in a direction that is generally perpendicular to the surface 32. The plasma 42 keeps the vortices 24 away from the peaks 28, thereby preventing the vortices 24 from contacting the peaks 28 or any other part of the surface, and thus enhancing the functionality of the riblets 26.

Some embodiments use a power supply 40 that produces a voltage at or above 30 kV (kilovolts). In an exemplary embodiment, the small spacing between the electrodes allows a much smaller power consumption. The frequency of the pulses may range from 2 kHz to 25 kHz, or may be higher or lower. The power consumption may be roughly 10 W/ft., but may vary widely depending on the electrode configuration. The voltage and current may be nearly 90 degrees out of phase, which may keep overall power consumption low.

Various types of power supply 40 may be used. In some embodiments, the power supply 40 produces superposition of DC offsets and AC voltages. Other embodiments may produce pulsed power output, including short pulses such as nanosecond pulses. The wave form of the output could be sinusoidal, or a variation of a sinusoidal output may be used to generate the desired optimum plasma generation and jet formation for a given electrode configuration.

Figure 4:
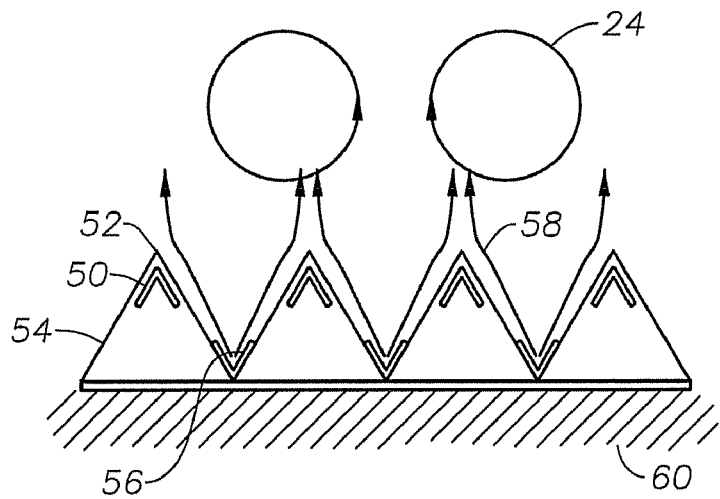
FIG. 4 is a cross-sectional view of an exemplary embodiment of plasma enhanced riblets, wherein the exposed electrode is at the base of the valley.

Referring to FIG. 4, in an exemplary embodiment, the buried electrode 50 may be placed at the peak 52 of the riblet 54, and the exposed electrode 56 placed at the bottom of the valley between the riblets 54. In this embodiment, the plasma flows from the valley towards the peak, and then the plasma jet 58 continues to shoot above the peak 52. The plasma flow is generally perpendicular to the surface 60 of the object that is moving through the fluid. Thus the plasma jet 58 pushes the turbulent vortices 24 away from the peaks 52, as well as the other areas of the surface.

Figure 5:
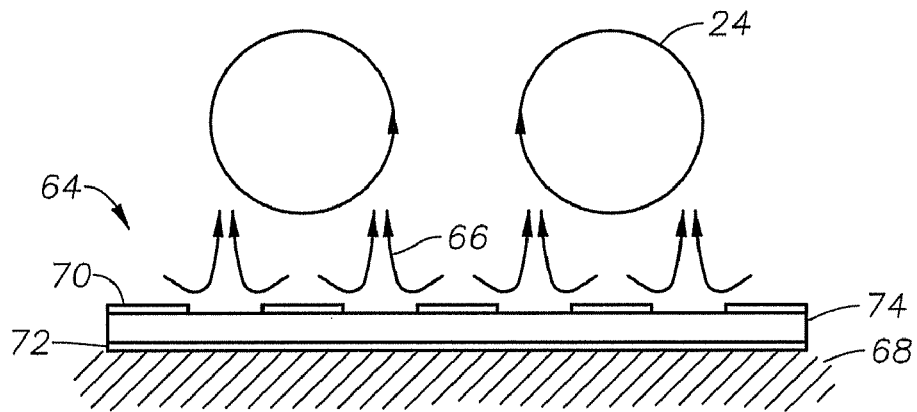
FIG. 5 is a cross-sectional view of an exemplary embodiment of a virtual plasma riblet.

Referring to FIG. 5, a virtual riblet 64 is created by plasma 66 generated along the surface of the object 68 moving through a fluid. In this exemplary embodiment, an exposed electrode 70 is located on the surface. A buried electrode 72 is located beneath a dielectric barrier 74. Electrical current to the electrodes 70, 72 generates plasma 66. The plasma induced flows 66, between the exposed electrodes 70, shoot out normal to the surface 68. Electrode 70 may be submerged or partially submerged in dielectric 74 to maintain a smooth wetted surface.

The plasma 66 serves the same role as a physical riblet (not shown), wherein the plasma 66 prevents the spinning vortices 24 from contacting the surface 68. The space between the electrodes 70 is small enough that the distance between the plasma jets 66 will be less than the diameter of the vortices 24 expected for the surface. In an exemplary embodiment, the vortices 24 are expected to be no smaller than 50 micrometers, and thus the space between the plasma jets 66 is no larger than 50 micrometers. In other embodiments, the space between the plasma jets could be as large as 500 microns.

In exemplary embodiments of both the plasma enhanced riblets 32 and the virtual riblets 64, the exposed electrode 28, 56, 70 may be a continuous electrode in the streamwise direction. The streamwise direction runs from front to rear in the direction of fluid flow. In another embodiment, multiple exposed electrodes 28, 56, 70 are evenly spaced along the streamwise direction. The streamwise distance between the exposed electrodes 28, 56, 70 may be less than the streamwise length of the spinning vortices 24. In the latter embodiment, conductors beneath the surface (not shown) could run in the streamwise or spanwise direction and connect the point electrodes to the power supply 40. Similarly, the buried electrode 38, 50, 72 may be a continuous electrode or it may be a series of point electrodes.

Dimensionless units, sometimes referred to as wall units, are conventionally utilized in describing fluid flows. As with physical riblets, the spacing of the plasma jets for virtual riblets may be measured in terms of s+. The term s+ is a distance tangent to the local surface and perpendicular to the flow direction. The spacing s+ is a non-dimensional unit defined as follows.

$$s+ = s*((C'_f/2)**0.5)*U/v$$

where s is the dimensional spacing between features (such as ridges)

v is the kinematic viscosity which is a property of the fluid $C'_f$ is a 'local' skin friction coefficient. $C'_f$ is defined as the local shear stress divided by the dynamic pressure, but may be estimated as:

$$C'_f = 0.0592/R_N^{1/5}$$

wherein $R_N$ is the Reynolds Number.

U is the freestream velocity magnitude.

The term s+ is a non-dimensionalized wall unit. In an exemplary embodiment, the space s+ between exposed electrodes does not exceed 30 wall units. The distance may be larger or smaller than 30 wall units. The buried electrodes may be evenly spaced between the exposed electrodes or the buried electrode can be continuous in all directions. In an exemplary embodiment, the buried electrodes and the exposed electrodes are point electrodes that are offset in both the streamwise and spanwise direction, such that the electrodes form a checkerboard pattern when viewed from above the surface.

The term h+ can be used to calculate the height of a riblet. It is calculated by the same formula as the formula to calculate s+ by using h instead of s. The term h refers to the dimensional height of the riblet. In an exemplary embodiment, the height h+ of the plasma jet may be 30 wall units, but could be larger or smaller.

A short riblet (not shown) is a riblet with a lower vertical height than a standard riblet. The riblet height could be, for example, h+=15, whereas a standard riblet might be h+=30. A portion of a spinning vortex may be able to fit between the peaks of a short riblet. In an exemplary embodiment, electrodes are placed on short riblets and in the valley between the short riblets. The physical riblet, combined with a vertical plasma jet, prevents spinning vortices from contacting the surface.

In operation, the plasma jets 42, 58, 66 push the vortices 24 straight out from the surface of the object moving through fluid. The plasma jet is generally perpendicular, or normal, to the surface of the object moving through fluid. In an exemplary embodiment, the DBD plasma jet is generally a weak plasma jet, meaning that the plasma is sufficient to push vortices away from the surface, but that it does not otherwise cause changes in the fluid flow. For example, the DBD plasma does not significantly delay transition to turbulent flow, nor does it delay laminar separation as the fluid moves across the surface. Rather, plasma jets 42, 58, and 66 reduce the drag associated with turbulent flow.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. One or more elements of the exemplary embodiments may be combined, in whole or in part, with one or more elements of one or more of the other exemplary embodiments. Many variations and modifications are possible and are within the scope of the invention. Accordingly, the scope of protection is not limited to the embodiments described, but is only limited by the claims that follow, the scope of which shall include all equivalents of the subject matter of the claims.

We claim:

1. An apparatus for reducing friction drag on a vehicle, comprising:
   a surface for mounting to a vehicle in a position for moving through a fluid;
   a plurality of ridges on the surface extending in a direction of fluid flow, each having a peak;
   a plurality of valleys separating the ridges, wherein the width of the valley is less than the streamwise width of a spinning vortex generated by the surface, the spinning vortex having an axis of rotation that is generally parallel to the direction of fluid flow;
   a first electrode attached to the ridge;
   a second electrode attached below the valley; and
   a power supply connected to the first and the second electrode, wherein the power supply causes a plasma discharge between the first electrode and the second electrode.

2. The apparatus of claim 1, wherein plasma discharge is generally perpendicular to the surface.

3. The apparatus of claim 1, wherein the power supply produces an output waveform, and wherein the output waveform comprises one or more of the following: sinusoidal wave forms, square wave forms, and pulses.

4. The apparatus of claim 1, wherein the first electrode is embedded below the surface.

5. The apparatus of claim 1, wherein the plasma discharge prevents a vortex from contacting a peak.

6. The apparatus of claim 1, wherein the first electrode is a continuous electrode running the length of the riblet.

7. The apparatus of claim 1, further comprising a series of second electrodes evenly spaced along the length of a valley, wherein the space between the first electrodes is less than the diameter of the spinning vortex.

8. An aircraft having an apparatus for reducing friction drag comprising:
   the aircraft having a surface, wherein movement of the surface in a streamwise direction through a fluid generates a plurality of turbulent mixing vortices, each of the plurality of turbulent mixing vortices having an axis of rotation that is generally parallel to the streamwise direction,
   a first electrode carried by the surface extending in the streamwise direction along the surface,
   a second electrode carried by the surface, wherein the distance s+ from the first electrode to the second electrode is less than 30 wall units;
   a power supply causing the electrodes to produce a plasma jet from the first electrode towards the second electrode,
   wherein the plasma jet extends perpendicularly away from the surface, and
   wherein a portion of the plasma jet prevents the plurality of spinning vortices from contacting the surface.

9. The apparatus according to claim 8, further comprising at least two riblets on the surface, each riblet having a peak, and
   a valley between the riblets,
   wherein the first electrode is located near the peak of the riblet and the second electrode is located in the valley.

10. The apparatus according to claim 8, wherein the surface comprises a dielectric material.

11. The apparatus according to claim 9, wherein the plasma first flows from two adjacent peaks toward the valley, then flows up from the valley, normal to the surface.

12. The apparatus according to claim 9, wherein the plasma flows from the valley toward the two adjacent peaks, then flows up from the peak, normal to the surface.

13. The apparatus according to claim 8, wherein the surface comprises a dielectric material, and wherein the first electrode is exposed and the second electrode is buried.

14. The apparatus according to claim 8, wherein the power supply produces superposition of direct-current offsets and alternating-current voltages.

15. The apparatus according to claim 8, wherein the power supply produces an output waveform, and wherein the output waveform comprises one or more of the following:
   sinusoidal wave forms, square wave forms, and pulses.

16. A method for reducing friction drag on a surface moving through a fluid, comprising:
 placing electrodes on a surface, the electrodes extending in a streamwise direction along the surface, wherein the distance s+ between the electrodes is less than 30 wall units,
 moving the surface through a fluid, wherein the movement generates vortices, the vortices having an axis of rotation that is generally parallel to the streamwise direction,
 using the electrodes to generate plasma on the surface, and
 pushing the vortices with the plasma, wherein the vortices are pushed in a direction that is generally normal to the surface.

17. The method of claim 16, further comprising placing riblets on the surface,
 wherein the electrodes are placed along the peaks of the of the riblets and in the valleys between the riblets.

18. The method of claim 14, wherein the spinning vortices do not contact the surface.

19. The method of claim 14, wherein the height of the plasma jet is less than 30 wall units.

20. The method of claim 14, wherein the surface forms a part of an aircraft.

* * * * *